(12) United States Patent
Fajardie et al.

(10) Patent No.: US 10,882,025 B2
(45) Date of Patent: Jan. 5, 2021

(54) CATALYST/CATALYST SUPPORT COMPOSITIONS HAVING HIGH REDUCIBILITY AND COMPRISING A NANOMETRIC CERIUM OXIDE DEPOSITED ONTO A SUPPORT SUBSTRATE

(71) Applicant: Rhodia Operations, Aubervilliers (FR)

(72) Inventors: Franck Fajardie, Rueil-Malmaison (FR); Stephan Verdier, Lyons (FR)

(73) Assignee: RHODIA OPERATIONS, Aubervilliers (FR)

( * ) Notice: Subject to any disclaimer, the term of this patent is extended or adjusted under 35 U.S.C. 154(b) by 93 days.

(21) Appl. No.: 15/883,766

(22) Filed: Jan. 30, 2018

(65) Prior Publication Data

US 2018/0345252 A1 Dec. 6, 2018

Related U.S. Application Data

(63) Continuation of application No. 12/439,448, filed as application No. PCT/EP2007/058901 on Aug. 28, 2007, now abandoned.

(30) Foreign Application Priority Data

Aug. 31, 2006 (FR) ..................... 06 07658

(51) Int. Cl.
| | | |
|---|---|---|
| *B01J 23/02* | (2006.01) | |
| *B01D 53/94* | (2006.01) | |
| *B01J 35/00* | (2006.01) | |
| *B01J 37/02* | (2006.01) | |
| *B01J 37/03* | (2006.01) | |
| *B01J 37/00* | (2006.01) | |
| *B01J 21/08* | (2006.01) | |
| *B01J 35/02* | (2006.01) | |
| *B01J 21/16* | (2006.01) | |
| *B01J 21/06* | (2006.01) | |
| *B01J 23/00* | (2006.01) | |
| *B01J 37/08* | (2006.01) | |
| *B01J 21/02* | (2006.01) | |
| *B01J 37/04* | (2006.01) | |
| *B01J 23/30* | (2006.01) | |

(52) U.S. Cl.
CPC ............ *B01J 23/02* (2013.01); *B01D 53/945* (2013.01); *B01J 21/02* (2013.01); *B01J 21/066* (2013.01); *B01J 21/08* (2013.01); *B01J 21/16* (2013.01); *B01J 23/002* (2013.01); *B01J 23/30* (2013.01); *B01J 35/0013* (2013.01); *B01J 35/023* (2013.01); *B01J 35/026* (2013.01); *B01J 37/0036* (2013.01); *B01J 37/0211* (2013.01); *B01J 37/0215* (2013.01); *B01J 37/0232* (2013.01); *B01J 37/036* (2013.01); *B01J 37/04* (2013.01); *B01J 37/082* (2013.01); *B01J 37/088* (2013.01); *B01D 2255/206* (2013.01); *B01D 2255/407* (2013.01); *B01D 2255/9202* (2013.01); *Y02T 10/12* (2013.01)

(58) Field of Classification Search
CPC .... B01J 23/02; B01J 35/0013; B01J 37/0211; B01J 37/0232; B01J 37/036; B01D 53/945; B01D 2255/9202; B01D 2255/206; B01D 2255/407; Y02T 10/22
See application file for complete search history.

(56) References Cited

U.S. PATENT DOCUMENTS

| | | | | |
|---|---|---|---|---|
| 5,945,369 A | * | 8/1999 | Kimura | ................ B01D 53/945 502/304 |
| 2004/0042939 A1 | * | 3/2004 | Rajaram | ............ B01D 53/9481 422/180 |

FOREIGN PATENT DOCUMENTS

WO WO-2006119550 A1 * 11/2006 .......... B01J 35/0013

* cited by examiner

*Primary Examiner* — Anthony J Zimmer
(74) *Attorney, Agent, or Firm* — Osha Bergman Watanabe & Burton LLP

(57) ABSTRACT

Catalyst/catalyst support compositions are characterized by a supported cerium oxide, deposited onto a silica, alumina, titanium or zirconium based support, including particles of said supported oxide deposited onto said support, individualized or in the form of aggregates, no greater than 500 nm in size and having, after 6 hours of calcination at a temperature of at least 800° C., a measured reducibility from 30° C. and 900° C. of at least 80%; such compositions are prepared by combining a colloidal dispersion of the supported oxide and a suspension of the support, drying the resulting mixture by atomization and drying the resulting product by calcination.

24 Claims, No Drawings

CATALYST/CATALYST SUPPORT COMPOSITIONS HAVING HIGH REDUCIBILITY AND COMPRISING A NANOMETRIC CERIUM OXIDE DEPOSITED ONTO A SUPPORT SUBSTRATE

This application is a continuation application of U.S. application Ser. No. 12/439,448, filed on Dec. 3, 2009, which is a national phase entry under 35 U.S.C. § 371 of PCT/EP2007/058901, filed on Aug. 28, 2007, and claims priority under 35 U.S.C. § 119 of FR-0607658, filed Aug. 31, 2006.

The present invention relates to a composition having high reducibility based on a nanometric cerium oxide on a support, to its process of preparation and to its use as catalyst.

"Multifunctional" catalysts are currently used for the treatment of exhaust gases for internal combustion engines (automobile afterburning catalysis). The term "multifunctional" is understood to mean catalysts capable of carrying out not only oxidation, in particular of carbon monoxide and hydrocarbons present in exhaust gases, but also reduction, in particular of nitrogen oxides also present in these gases ("three-way" catalysts). Zirconium oxide and cerium oxide today appear as two constituents which are particularly important and advantageous for catalysts of this type.

To be effective, these catalysts must exhibit good reducibility. The term "reducibility" is to be understood to mean, here and for the remainder of the description, the ability of the catalyst to be reduced in a reducing atmosphere and to be reoxidized in an oxidizing atmosphere. This reducibility can be measured, for example, by consumption of hydrogen in a given temperature range. It is due to the cerium, in the case of the compositions of the type of those of the invention, cerium having the property of being reduced or of being oxidized.

Materials with an increasingly high reducibility are thus sought for for their effectiveness. A first subject matter of the invention is thus the development of such materials.

Furthermore, materials having high reducibility even in a relatively low temperature range, that is to say of at most 600° C., are also sought for.

A second subject matter of the invention is the provision of materials which satisfy the latter condition.

With this aim, the composition according to the invention comprises a supported oxide, based on a cerium oxide, on a support based on silica, alumina, titanium oxide or zirconium oxide, and it is characterized in that it comprises particles of said supported oxide, deposited on said support, which particles are separate or in the form of aggregates, with a size of at most 500 nm, and in that it exhibits, after calcination at a temperature of at least 800° C. for 6 hours, a reducibility measured between 30° C. and 900° C. of at least 80%.

According to a specific embodiment of the invention, the composition comprises a supported oxide, based on a cerium oxide, on an alumina-based support, characterized in that it comprises particles of said supported oxide, deposited on said support, which particles are separate or in the form of aggregates, with a size of at most 500 nm, and in that it exhibits, after calcination at a temperature of at least 800° C. for 6 hours, a reducibility measured between 30° C. and 900° C. of at least 80%, the compositions in which the alumina support additionally comprises at least one element from the group consisting of barium and strontium being excluded.

Other characteristics, details and advantages of the invention will become even more fully apparent on reading the description which will follow and also the various concrete but non-limiting examples intended to illustrate it.

The term "rare earth metal" is to be understood to mean the elements of the group consisting of yttrium and the elements of the Periodic Table with an atomic number of between 57 and 71 inclusive.

The term "specific surface" is to be understood to mean the BET specific surface determined by nitrogen adsorption in accordance with the ASTM D 3663-78 Standard, drawn up from the Brunauer-Emmett-Teller method described in the periodical "The Journal of the American Chemical Society, 60, 309 (1938)".

The composition of the invention comprises a supported oxide in the form of particles of nanometric dimensions, these particles being deposited on a support.

This supported oxide can be first of all an oxide of cerium alone, a simple oxide, generally in the form of ceric oxide $CeO_2$. It can also be a mixture of a cerium oxide and of at least one oxide of another element M which is chosen from zirconium and rare earth metals other than cerium. According to specific embodiments of the invention, this oxide mixture can correspond to the formula (1) $Ce_{1-x}Zr_xO_2$ in which x is less than 1 or also to the formula (2) $Ce_{1-y-z}Zr_yLn_zO_2$ in which y+z<1, Ln denoting at least one rare earth metal. The Ce/Zr atomic ratio can vary within wide limits, for example from 0.1 to 0.9. However, more particularly, the value of x or of the sum y+z can be at most 0.5.

According to a specific embodiment, the supported oxide is in the crystalline form.

According to another specific embodiment, the mixture of oxides is provided in the form of a solid solution of the element M in the cerium or also in the form of a solid solution (mixed oxide) of the cerium and optionally of a rare earth metal in the zirconium, this being the case according to the respective amounts of the cerium and of the zirconium. In the first case, the supported oxide exhibits a single phase which in fact corresponds to a crystal structure of fluorine type, just like crystalline ceric oxide $CeO_2$, the unit cell parameters of which are more or less offset with respect to a pure ceric oxide, thus reflecting the incorporation of the element M in the crystal lattice of the cerium oxide. In the second case, the supported oxide exhibits a single phase corresponding to that of a zirconium oxide crystallized in the tetragonal system in particular, thus reflecting the incorporation of the cerium and optionally of the other element in the crystal lattice of the zirconium oxide.

The supported oxide is present in the composition of the invention in the form of particles of nanometric dimensions. This is to be understood to mean that the particles exhibit a size of at most 500 nm. It should be noted here that these particles can either be separate or in the form of aggregates. The value of 500 nm applies either to the size of the particles, when the latter are separate, or to the size of the aggregate, provided that there are aggregated particles. Furthermore, this size can more particularly be at most 50 nm and more particularly still at most 10 nm. The highest size values given above correspond to the cases where the particles are generally in an aggregated form, while the lowest values correspond to the cases where the particles are generally in a separate form. More particularly, the particles are in the separate form with a size of approximately at most 50 nm, more particularly still at most 10 nm, or also with a size of between 10 nm and 5 nm, and, in the case where the oxide is crystalline, they correspond to crystallites of this oxide. According to a specific embodiment, the particles are in the separate form with a size of at most 5 nm, this embodiment corresponding to the case where the content of supported oxide of the composition is relatively low, this low content being specified later. The size values given here and in the present description are determined either by transmission electron microscopy (TEM) or by X-ray diffraction (XRD), in particular when the oxide is crystalline.

These size values for particles of the supported oxide are given for a composition which has been subjected to a calcination at a temperature of at least 500° C., more particularly of at least 800° C., for 6 hours.

As indicated above, the particles are deposited on a support. This is to be understood to mean that the particles are predominantly present on the surface of the support, it being understood that the particles can be present inside the pores of the support but while remaining at the surface of these pores.

The support is based on silica, on alumina, on titanium oxide or on zirconium oxide. Preferably, this support should exhibit a high and stable specific surface, that is to say a specific surface which remains at a satisfactory value even after exposure to a high temperature.

The constituent oxides of the support which have just been mentioned are well known and are used in the field of catalysis. The description below relating to these supports is thus given purely by way of illustration and is not limiting.

In the case of a silica-based support, the silica can be a precipitated silica or a pyrogenic silica. The silica can optionally be stabilized by a stabilizing element, such as aluminum.

In the case of an alumina-based support, use may be made here of any type of alumina capable of exhibiting a specific surface satisfactory for application in catalysis. Mention may be made of the aluminas resulting from the rapid dehydration of at least one aluminum hydroxide, such as bayerite, hydrargillite or gibbsite, or nordstrandite, and/or of at least one aluminum oxyhydroxide, such as boehmite, pseudoboehmite and diaspore.

According to a specific embodiment of the invention, use is made of a stabilized alumina. Mention may be made, as stabilizing element, of rare earth metals, barium, strontium, silicon and zirconium. Mention may very particularly be made, as rare earth metal, of cerium, lanthanum or the lanthanum-neodymium mixture. These elements can be used alone or in combination. Mention may be made, as advantageous combinations, of La—Ba, Ba—Pr, La—Pr—Ba and La—Pr.

The stabilized alumina can be prepared in a way known per se, in particular by impregnation of the alumina with solutions of salts, such as nitrates, of the abovementioned stabilizing elements or also by codrying an alumina precursor and salts of these elements and then calcining.

Mention may furthermore be made of another preparation of the stabilized alumina in which the alumina powder resulting from the rapid dehydration of an aluminum hydroxide or oxyhydroxide is subjected to a maturing operation in the presence of a stabilizing agent composed of a lanthanum compound and optionally a neodymium compound, it being possible for this compound to be more particularly a salt. The maturing can be carried out by suspending the alumina in water and then heating at a temperature of, for example, between 70 and 110° C. After the maturing, the alumina is subjected to a heat treatment.

Another preparation consists of a similar type of treatment but with barium or strontium.

The content of stabilizing agent, expressed as weight of stabilizing agent oxide with respect to the stabilized alumina, is generally between 1.5% and 35% or also between 1.5% and 25%, in particular between 1.5% and 15%. This content can more particularly be between 2.5% and 20%, more particularly between 2.5% and 11% or also between 5% and 20%.

According to a specific embodiment, the stabilizing agent is barium and/or strontium in a content, expressed as weight of stabilizing agent oxide with respect to the stabilized alumina, of less than 10%.

According to two other specific embodiments, the support is based on alumina stabilized by a stabilizing element from the group consisting of barium, strontium and lanthanum and the supported oxide is, in the first case, a mixture of cerium oxide, of zirconium oxide and of oxide of a rare earth metal other than cerium which can more particularly be praseodymium or lanthanum. In the second case, the supported oxide is a mixture of cerium oxide, of praseodymium oxide and of oxide of a rare earth metal other than cerium and praseodymium which can more particularly be lanthanum. For these two embodiments, the content of stabilizing element, expressed as oxide, can be equal to at least 10% by weight, with respect to the stabilized alumina, and it can more particularly be between 10 and 30% by weight, in particular between 10 and 25% by weight.

According to other specific embodiments, the support is essentially composed of alumina (first form) or is essentially composed of alumina stabilized by at least one element chosen from rare earth metals, silicon and zirconium (second form). The term "is essentially composed of" is understood to mean, in the case of the first form, that the support comprises only alumina and no other element capable of stabilizing the latter, it being possible for the alumina optionally to comprise the usual impurities. In the case of the second form, it is understood that the support comprises only alumina and, as stabilizing agent, only one or more elements in combination chosen solely from the group consisting of rare earth metals, silicon and zirconium with, here again, the possible presence of impurities normally linked with the alumina and with the abovementioned element.

In the case of a support based on alumina stabilized by a stabilizing element chosen from rare earth metals, barium and strontium or essentially composed of alumina stabilized with this same stabilizing element, it may be noted here that the preparation of the stabilized alumina can be carried out during the actual preparation of the composition according to the invention. This preparation will be described later.

The support can also be made of titanium oxide, more particularly of titanium oxide in the anatase form. Such an oxide can be prepared, for example, by the processes described in EP-A-319 365 or in EP-A-351 270 and it can also comprise a stabilizing agent of rare earth metal or alkaline earth metal type.

Finally, the support can be a tetragonal or monoclinic zirconium oxide which is optionally stabilized, for example by a rare earth metal.

It should also be noted that the support can be composed of a combination of the abovementioned oxides, either in the form of mixtures of these oxides or in the form of mixed oxides (solid solutions), such as silica/alumina, titanium oxide/silica or zirconium oxide/silica mixed oxides.

It should be noted that it is also possible to introduce the stabilizing elements of the various supports which have been mentioned after having prepared the composition (supported oxide on support free from stabilizing agent), for example by an impregnation technique.

The content of supported oxide, for example cerium oxide, of the composition of the invention is generally at most 75% by weight of the whole of the composition. It can in particular be at most 60%, more particularly at most 50% and more particularly still at most 30%. In the specific case of a support made of zirconium oxide, the content of supported oxide can correspond to the values which have just been given and it can also be more particularly at most 55%.

The minimum content of supported oxide is set according to the performances desired for the composition. By way of example only, this minimum content is generally at least 3% by weight, more particularly at least 4% by weight.

As indicated above, the particles of the supported oxide can be in the separate form with a size of at most 5 nm. This embodiment preferably corresponds to the compositions in which the content of supported oxide is at most 20% by weight, more particularly at most 15% by weight and more particularly still at most 10% by weight.

In the case of the specific embodiments described above for which the support is based on alumina stabilized by barium and the supported oxide mixtures of cerium oxide, of zirconium oxide and of oxide of a rare earth metal other than cerium or of cerium oxide, of praseodymium oxide and of oxide of a rare earth metal other than praseodymium, the content of supported oxides can more particularly be equal to or greater than 15%, more particularly between 15 and 30%.

An advantageous characteristic of the compositions of the invention is their reducibility.

The reducibility of the compositions is determined by the measurement of their hydrogen consumption, measured between 30° C. and 600° C. or 900° C. This measurement is carried out by programmed reduction in temperature using hydrogen diluted in argon. A signal is detected with a thermoconductivity detector. The consumption of hydrogen is calculated from the missing surface area of the hydrogen signal from the base line at 30° C. to the base line at 600° C. or 900° C. The degree of reducibility represents the percentage of reduced cerium, it being understood that ½ mol of $H_2$ consumed and measured by the method described above corresponds to 1 mol of reduced Ce(IV).

Within the meaning of the present invention and for the compositions comprising only cerium as a reducible element, the reducibility measured between 30° C. and 900° C. corresponds to the percentage of the total cerium present in the supported oxide which has been reduced, this percentage being measured by the method described above in the temperature range extending from 30° C. to 900° C. The reducibility measured between 30° C. to 600° C. corresponds to the same measurement but carried out in the temperature range from 30° C. to 600° C.

In the case of the compositions comprising, in addition to the cerium, another reducible element, such as praseodymium, the overall reducibility of the cerium and the praseodymium is calculated. The overall reducibility of the cerium and of the praseodymium is calculated by relating the experimental hydrogen consumption of the composition to the sum of the theoretical hydrogen consumptions corresponding to the complete reduction of the cerium and to the complete reduction of the praseodymium. The experimental hydrogen consumption is calculated from the missing surface area of the hydrogen signal from the base line at 30° C. to the base line at 900° C., when the reducibility is measured between 30° C. and 900° C. The theoretical hydrogen consumption for the complete reduction of the cerium is calculated as above on the assumption that all the cerium is initially at the +IV state and that ½ mol of $H_2$ is consumed to reduce 1 mol of Ce(IV). The theoretical hydrogen consumption for the complete reduction of the praseodymium is calculated analogously on the assumption that ⅔ of the praseodymium is present at the +IV oxidation state in $Pr_6O_{11}$ and that ½ mol of $H_2$ is consumed to reduce 1 mol of Pr(IV).

Furthermore, and for the whole of the description, the values which are given for the reducibility result from measurements carried out on compositions which have been subjected beforehand to a calcination at a temperature of at least 800° C. for 6 hours under air.

As indicated above, the compositions of the invention exhibit a reducibility, measured between 30° C. and 900° C., of at least 80%. This reducibility thus measured can more particularly be at least 85% and more particularly still at least 90%.

A more specific embodiment of the invention gives compositions having a high reducibility even in a relatively low temperature range, that is to say of at most 600° C. This embodiment corresponds to the case where the supported oxide is cerium oxide alone or a mixture of a cerium oxide and of a zirconium oxide, with optionally an oxide of a rare earth metal other than cerium, and with a zirconium content such that the Ce/Zr atomic ratio is at least 1. In this case, these compositions can exhibit a reducibility, measured between 30° C. and 600° C. (also after calcination at a temperature of at least 800° C. for 6 hours), of at least 35%, more particularly of at least 40%. Of course, these compositions also exhibit the same values for reducibility measured between 30° C. and 900° C. as those which were given above.

Finally, the compositions of the invention can exhibit a high BET specific surface which can be, after calcination at 800° C. for 6 hours, at least 95 $m^2/g$, more particularly at least 110 $m^2/g$, this surface depending on the nature of the support used.

Processes for the preparation of the compositions of the invention will now be described.

The continuation of the description will comprise the description of a first preparation process (A), the description of a specific colloidal dispersion (B) which can be used more particularly in the case of the present invention and the description of three other processes (C), (D) and (E) for the preparation of compositions of the invention.

A First Process for the Preparation of the Compositions of the Invention

This first process comprises the following stages:
a colloidal dispersion of the supported oxide and, if appropriate, of the oxide of the element M and a colloidal suspension of the support are brought together;
the mixture thus formed is dried by atomization;
the dried product thus obtained is calcined.

The first stage of this process thus consists in forming a mixture starting from a colloidal dispersion of the supported oxide, for example the cerium oxide. In the case of the preparation of a composition in which the supported oxide is a mixture of a cerium oxide and at least one oxide of another element M, this mixture additionally comprises a colloidal dispersion of an oxide of this element. It is also possible to use a single colloidal dispersion in which the colloids are based on a mixed oxide of cerium and of the element M.

The term "colloidal dispersion" denotes any system composed of fine solid particles of colloidal dimensions, that is to say dimensions of between approximately 1 nm and approximately 500 nm, based on a compound of cerium and/or the element M, this compound generally being an oxide and/or an oxide hydrate, in stable suspension in an aqueous liquid phase, it being possible for said particles in addition to optionally comprise residual amounts of bonded or adsorbed ions, such as, for example, nitrates, acetates, chlorides or ammoniums. It should be noted that, in such a colloidal dispersion, the cerium or the element M can occur either completely in the form of colloids or simultaneously in the form of ions and in the form of colloids.

Mention may thus be made, as suitable cerium oxide dispersions, of those described or obtained by the processes described in patent applications EP-A-206 906, EP-A-208 580, EP-A-208 581, EP-A-239 477 and EP-A-700 870. In the case of the dispersions of mixed oxides, use may be made of those described in patent application EP-A-1 246 777.

Use may in particular be made of a colloidal dispersion of the cerium oxide, simple or mixed oxide, which comprises an amino acid. This acid can more particularly be an aliphatic amino acid. This can in particular be a $C_4$-$C_{10}$ acid and preferably a $C_4$-$C_8$ acid. Such a dispersion is described in patent application EP-A-1 301 435.

A mixture of the dispersion with a suspension of the support is formed. This suspension is generally based on the support or on a precursor of the support, that is to say a compound which, after calcination, can result in alumina, silica, zirconium oxide or titanium oxide. Dried precursors, that is to say exhibiting a loss on ignition of at most 50%, more particularly of at most 25%, may be concerned. These can in particular be hydroxides or oxyhydroxides. The suspension is generally an aqueous suspension.

Mixing is carried out in an aqueous phase, generally water and, for example, distilled or deionized water.

The second stage of the process is a drying stage.

This drying is carried out by atomization.

The term "drying by atomization" is to be understood to mean drying by spraying the mixture into a hot atmosphere (spray drying). The atomization can be carried out by means of any sprayer known per se, for example by a spray nozzle of the shower head or other type. Use may also be made of "rotary" atomizers. Reference may in particular be made, with regard to the various spraying techniques capable of being employed in the present process, to the reference work by Masters entitled "Spray Drying" (second edition, 1976, published by George Godwin, London).

The final stage of the process is a calcination stage.

This calcination makes it possible to develop the crystallinity of the product formed and it can also be adjusted and/or chosen according to the subsequent operating temperature reserved for the composition according to the invention, this being done while taking into account the fact that the specific surface of the product decreases as the calcination temperature employed increases. Such a calcination is generally carried out under air but a calcination carried out, for example, under an inert gas or under a controlled atmosphere (oxidizing or reducing) is very clearly not excluded.

In practice, the calcination temperature is generally restricted to a range of values of between 500° C. and 1000° C., preferably between 600° C. and 800° C.

According to a first alternative form of this process, it is possible to carry out a simple calcination under $H_2$ at a temperature of between 800 and 1000° C. for at least 2 h, more particularly at least 4 h and more particularly still at least 6 h.

According to another alternative form of this process, it is possible to carry out a double calcination. It is thus possible to carry out a first calcination under an inert gas or under vacuum. The inert gas can be helium, argon or nitrogen. The vacuum is generally a low vacuum with an oxygen partial pressure of less than $10^{-1}$ mbar. The calcination temperature is at least 900° C. and generally at most 1000° C. The time for this first calcination is generally at least 2 hours, preferably at least 4 hours and in particular at least 6 hours. An increase in this time generally results in an increase in the degree of reducibility. Of course, the time can be set according to the temperature, a low calcination time requiring a higher temperature.

A second calcination is subsequently carried out under an oxidizing atmosphere, for example under air. In this case, the calcination is generally carried out at a temperature of at least 600° C. over a time which is generally at least 30 minutes. It is preferable not to exceed a calcination temperature of 900° C.

B Specific Colloidal Dispersion

A more specific description will be given below of a dispersion which may be useable in the context of the invention, very particularly when it is desired to prepare a composition having a supported oxide which is a mixed oxide or solid solution.

This dispersion is a colloidal dispersion, in a continuous phase, of a compound of cerium and of at least one other element M chosen from zirconium and rare earth metals (Ln) other than cerium and it is characterized in that the compound is in the form of a mixed oxide in which the cerium and the element M are in pure solid solution and in that the compound comprises cerium in the form of cerium (III) in an amount, expressed as cerium(III)/total cerium atomic ratio, of between 0.005 and 0.06.

This dispersion can be prepared by a process which comprises the following stages:
  a liquid medium is formed comprising salts of cerium and of at least one element M, the cerium salts being cerium(IV) and cerium(III) salts:
  the medium is brought into contact with a base, so as to obtain a pH of at least 9, whereby a precipitate is obtained;
  said precipitate is separated from the medium;
  the precipitate is washed;
  the precipitate is peptized by treatment with an acid, whereby the dispersion is obtained; the process additionally comprising at least one washing stage, either after the stage of separation of the precipitate or after the peptization stage.

The liquid continuous phase of the dispersion described here is generally an aqueous phase, more particularly water.

One of the specific characteristics of the dispersion described here is that, in the colloidal particles, the above-mentioned compound of which they are formed is in the form of a mixed oxide $(Ce,M)O_2$ in which the cerium and the element M are in solid solution. This term is to be understood to mean that one of the elements, generally the element M, is completely incorporated in the crystal lattice of the oxide of the other matrix-forming element, for example the cerium. This incorporation can be demonstrated by the X-ray diffraction technique on colloids after washing, in particular by ultrafiltration or also by ultracentrifugation, and drying at a temperature of 60° C. The X-ray diagrams reveal the presence of a crystal structure corresponding to the oxide of the matrix-forming element (generally cerium oxide), the unit cell parameters of which are more or less offset with respect to a pure oxide of this first matrix-forming element, which thus demonstrates the incorporation of the other element in the crystal lattice of the oxide of the first. For example, in the case of a solid solution of the element M in cerium oxide, the X-ray diagrams then reveal a crystal structure of fluorine type, just like crystalline ceric oxide $CeO_2$, the unit cell parameters of which are more or less offset with respect to a pure ceric oxide, thus reflecting the incorporation of the element M in the crystal lattice of the cerium oxide.

The solid solution is pure, that is to say that, for the colloidal particles, the total amount of an element is in solid solution in the other, for example all the element M is in solid solution in the cerium oxide. In this case, the X-ray diagrams show only the presence of the solid solution and do not comprise lines corresponding to an oxide such as oxide of the element other than the matrix-forming element, for example an oxide of the element M. However, it is not out of the question for the liquid continuous phase to be able to comprise a certain amount of element M in the form of ions originating from a portion of the total amount of the element M introduced during the preparation of the dispersion.

As indicated above, the element M is chosen from the group consisting of zirconium and rare earth metals (Ln) other than cerium, it being possible, of course, for these elements to be present as a mixture, as will be seen in the continuation of the description.

Another characteristic of the dispersion described here is the presence of cerium in the form of cerium(III). The amount of cerium(III), expressed by the cerium(III)/total cerium atomic ratio, is between 0.005 and 0.06. More particularly, this amount can be between 0.005 and 0.05 and more particularly still between 0.005 and 0.03.

It should be noted here that the cerium(III) can be present in the compound as cation, either in the form adsorbed at the surface of the particles of the cerium compound or in the crystal unit cell of the compound. Of course, both these forms may coexist.

The presence of cerium(III) in solution can be demonstrated by chemical quantitative determination. Use may thus be made of a technique for analysis by potentiometric titration by oxidation of cerium(III) to give cerium(IV) using potassium ferricyanide in potassium carbonate medium. The presence of cerium(III) at the surface of the particles of the dispersion can be demonstrated by the determination of the isoelectric point of the colloidal dispersions. This determination is carried out in a known way by measuring the variation in the zeta potential of the dispersions. When the variation in this potential is measured, by varying the pH of a dispersion from an acidic value to a basic value, this potential changes from a positive value to a negative value, the transition at the zero value of the potential constituting the isoelectric point. The presence of cerium(III) at the surface increases the value of the isoelectric point with respect to a compound comprising only cerium(IV).

Various alternative forms of the dispersion described here, depending on the nature of the cerium compound and more specifically on the nature of the element M, will now be described in more detail. It should be noted here that the formulae which are given below in the description of these alternative forms correspond to compositions which result from chemical analyses on colloids recovered either by ultracentrifuging at 50 000 rev/min for 6 hours or else after washing the dispersions, this washing being carried out by ultrafiltration or by dialysis with at least 10 equivalent volumes of water (1 volume of dispersion: 10 volumes of water).

According to a first alternative form, the element M is zirconium. More particularly, in the case of this alternative form, the compound can correspond to the formula (3) $Ce_{1-x}Zr_xO_2$ in which x is less than 1 and is at least equal to 0.01, preferably at least equal to 0.02.

According to a second alternative form, the element M is a combination of zirconium and of at least one rare earth metal Ln. This alternative form is particularly advantageous in the case where the rare earth metal is a trivalent rare earth metal. The rare earth metal can be in particular lanthanum, gadolinium, terbium, praseodymium or neodymium. More particularly, in the case of this second alternative form, the compound can correspond to the formula (4) $Ce_{1-x-y}Zr_xLn_yO_2$ in which x+y<1, x adheres to the condition $0.05 \leq x \leq 0.95$ and y is at least equal to 0.01, the high value of y being chosen so that a solid solution is indeed obtained. Preferably, x adheres to the condition 0.20×0.8 and more preferably still the condition $0.40 \leq x \leq 0.60$. Preferably also, y is at least equal to 0.02 and more preferably still y is at least equal to 0.03. Preferably, y is at most equal to 0.05 and more preferably still to at most 0.04. Still in the case of this alternative form, the element M can be a combination of at least two rare earth metals, at least one of which is praseodymium. Finally, it may be noted that, in the case where M is terbium or praseodymium, optionally in combination with another rare earth metal, these elements can be present both in the Tb(III) and Pr(III) forms and the Tb(IV) and Pr(IV) forms.

The compound of the dispersion described here can also be a compound in which M is a rare earth metal or a combination of rare earth metals. Again, a particularly advantageous case is that where the rare earth metal is a trivalent rare earth metal. The rare earth metal can in particular be lanthanum, gadolinium, terbium, praseodymium or neodymium. The compound can then correspond more particularly to the following formula (5) $Ce_{1-x}Ln_xO_2$ in which x is at most equal to 0.15 and is at least equal to 0.01, preferably at least equal to 0.02 and more preferably still at least equal to 0.04. Preferably, x is at most equal to 0.10 and more preferably still at most equal to 0.05. The rare earth metal can be present, at least in part, in the Ln(III) form and, here again, either in the crystal unit cell or in the form adsorbed at the surface of the particles of the cerium compound. In the case of praseodymium, the latter element can be present both in the Pr(III) and Pr(IV) forms and, in the same case, x is more particularly at least equal to 0.04 and more particularly still between 0.03 and 0.08. Finally, the compound of the dispersion can also correspond to the formula (6) $Ce_{1-x}Ln'_xO_2$ where Ln' describes a combination of at least two rare earth metals and where x is at most equal to 0.30 and can preferably be at least equal to 0.01.

The particles which constitute the compound of the dispersion exhibit a fine and narrow particle size distribution. This is because they have a size, measured by their mean diameter, which is preferably at most 10 nm and which can more particularly be between 2 and 8 nm. This size is conventionally determined by transmission electron microscopy (TEM) on a sample dried beforehand on a carbon membrane supported on a copper grid and over a mean of 50 measurements.

In addition, these particles are well separated. The cryo-TEM technique can be used to determine the state of aggregation of the particles. It makes it possible to observe, by transmission electron microscopy, samples kept frozen in their natural medium, which can, for example, be water.

Freezing is carried out on thin films with a thickness of approximately 50 to 100 nm in liquid ethane for the aqueous samples.

The state of dispersion of the particles is well preserved by cryo-TEM and representative of that present in the true medium. In the present case, cryo-TEM demonstrates the well-separated aspect of the particles.

The dispersion described here generally exhibits a pH which can be between 0.5 and 6.

The dispersion generally exhibits a concentration of mixed oxide of at least 0.1M, preferably of at least 0.25M and advantageously of greater than 1M.

Other specific embodiments of the dispersion will now be described.

A specific embodiment corresponds to dispersions having a basic pH. According to this embodiment, the compound of cerium and of at least one other element M exists in the form of particles additionally comprising citrate anions, these anions being adsorbed at the surface of the particles. The molar ratio r=citric acid/mixed oxide is generally between 0.1 and 0.6, preferably between 0.2 and 0.45. For this embodiment, the pH of the dispersions is at least 7, preferably at least 8.

Another specific embodiment corresponds to dispersions which are functionalized. In this case, the compound of cerium and of at least one other element M exists in the form of particles comprising, at the surface, a bifunctional compound comprising a functional group $R_1$ of amine, sulfate, phenyl, alkylethoxy or succinate type and a functional group $R_2$ of carboxylic, dicarboxylic, phosphoric, phosphonic or sulfonic type, the functional groups $R_1$ and $R_2$ being separated by an organic chain of the —$(CH_2)_x$— type, x preferably being at most equal to 6. It may be thought that this bifunctional compound is bonded at the surface by interactions of complexing type between the functional group $R_2$ and the cerium or M present at the surface of the colloidal particles. The molar ratio r'=bifunctional compound/mixed oxide is generally at most 0.6, preferably at most 0.4 and more preferably still at most 0.2.

The bifunctional compound can be chosen from aliphatic amino acids, for example aminocaproic acid, aminated sulfonic acids, such as aminoethylsulfonic acid, or alkyl polyoxyethylene ether phosphates.

Finally, it should be noted that the colloidal dispersions described here are particularly stable, that is to say that separation by settling or phase separation is not observed over a period of time which can be greater than 1 year.

The process for the preparation of the dispersions described here will now be explained in detail.

As indicated above, this process comprises a first stage in which a liquid medium comprising cerium salts and salts of at least one element M is formed, the cerium salts being cerium(IV) and cerium(III) salts. The proportion of cerium (III) salts and of cerium(IV) salts, expressed by the Ce(III)/ total Ce (Ce(III)+Ce(IV)) molar ratio, is generally at least 2% and at most 20%, preferably between 2% and 10%, this proportion being chosen according to the level of cerium(III) desired in the colloidal dispersion which it is desired to prepare. The liquid medium is generally water and the salts are usually introduced in the form of solutions.

The salts can be salts of inorganic or organic acids, for example of the sulfate, nitrate, chloride or acetate type, it being understood that the starting medium must comprise at least one cerium(IV) salt. Use may more particularly be made, as Ce(IV) solution, of a ceric ammonium nitrate solution to which Ce(III) is added in the form of cerous nitrate or Ce(III) acetate or cerous chloride. Use may also be made of a ceric nitrate solution obtained by attack on $CeO_2$ by nitric acid, Ce(III) being added to this solution. Use may advantageously be made of a ceric nitrate solution obtained by electrolysis and comprising Ce(III). The solution of Zr(IV) can be of $ZrOCl_2$ or of $ZrO(NO_3)_2$. The rare earth metals Ln are generally introduced in the form of Ln(III) salts, for example nitrates.

The second stage of the process consists in bringing the medium formed above into contact with a base.

Use may in particular be made, as base, of products of the hydroxide type. Mention may be made of alkali metal hydroxides, alkaline earth metal hydroxides and aqueous ammonia. Use may also be made of secondary, tertiary or quaternary amines. However, the amines and aqueous ammonia may be preferred insofar as they reduce the risks of contamination by alkali metal or alkaline earth metal cations.

The addition of the base is carried out instantaneously or gradually but so as to obtain a pH of the medium of at least 9, preferably of at least 9.5 and more preferably still of at least 10. The addition of the base results in the formation of a precipitate.

After the addition of the base, it is possible to carry out a maturing of the medium for a period of time which can vary, for example, between 10 minutes and 1 hour, generally at ambient temperature.

The precipitate can be separated from the liquid medium by any known process, for example by centrifuging.

The precipitate resulting from the reaction can subsequently be washed. This washing can be carried out by putting the precipitate back into water and then, after stirring, by separating the solid from the liquid medium, for example by centrifuging. This operation can be repeated several times, if necessary. Generally, this washing is carried out so as to obtain a washing slurry, that is to say the water in which the precipitate is resuspended, with a pH of at most 8.75, preferably of at most 8, advantageously of at most 7.

The final stage of the process is a stage of peptization of the precipitate obtained above. This peptization is carried out by treatment of the precipitate with an acid. This treatment is generally carried out by dispersing the precipitate in an acidic solution and stirring the medium thus formed. Use may be made, for example, of nitric acid, hydrochloric acid or acetic acid. Acetic acid can advantageously be used to obtain dispersions of compounds in which the content of trivalent rare earth metal is high. The peptization is generally carried out at a temperature between ambient temperature and 90° C., preferably at ambient temperature. The amount of acid used is such that the $H^+/(Ce+M)$ molar ratio is generally at most 1.5, preferably at most 1.25 and more preferably still at most 1. On conclusion of the peptization, a colloidal dispersion is obtained directly and without another intermediate stage.

It is possible to wash, by ultrafiltration or by dialysis, the dispersion thus obtained. This washing makes it possible to remove the element M which might occur in ionic form.

It should be noted that the process described here comprises at least one washing stage, it being possible for this washing to take place under the conditions which have just been described, that is to say either on the precipitate or on the dispersion or also on both.

For the specific embodiment described above in which the particles comprise citrate anions at the surface, the preparation process is of the type of that which has just been described but it is supplemented by a stage of bringing into contact with citric acid. More specifically, the citric acid can be added to the dispersion obtained after peptization, for example in the form of a citric acid hydrate powder. The citric acid then dissolves with stirring. The citric acid/mixed oxide molar ratio is within the range of values given above, that is to say generally between 0.1 and 0.6. It is possible to leave the medium obtained standing for between 30 minutes and 24 hours at ambient temperature.

Subsequently, a solution of a base is gradually added, this base being of the same type as that described above for the precipitation stage, so as to obtain the desired pH of at least 7, preferably of at least 8.

More specifically, the addition can be carried out for between 10 min and 2 hours at ambient temperature.

Likewise, in order to obtain a functionalized dispersion according to the embodiment described above, the bifunctional compound is added to the dispersion obtained after peptization.

After the description of the colloidal dispersions capable of being used as starting material in the preparation of the compositions of the invention, the description of other processes will be given below.

C Second Process for the Preparation of the Compositions of the Invention

The compositions of the invention can also be prepared by a second process which will be described below.

This process comprises the following stages:
- a liquid mixture comprising a salt of cerium and, if appropriate, of the element M and a suspension of the support is formed;
- the mixture thus formed is heated at a temperature of at least 100° C.;
- the precipitate thus obtained is recovered;
- said precipitate is calcined.

For the first stage, the starting material is also a colloidal suspension or dispersion of the support but it is mixed with a salt of cerium and, in the case of a composition where cerium oxide is a mixed oxide, of the element M. This mixing is carried out in an aqueous phase, generally water.

The salts can be chosen from nitrates, sulfates, acetates, chlorides or ceric ammonium nitrate.

Mention may thus be made, by way of examples, of zirconyl sulfate, zirconyl nitrate or zirconyl chloride. Zirconyl nitrate is most generally used. Mention may also in particular be made of cerium(IV) salts, such as the nitrate, or ceric ammonium nitrate, for example, which are particularly well suited here. Preferably, ceric nitrate is used.

The following stage of the process is the stage of heating the liquid mixture thus formed.

The temperature at which the liquid mixture is heated is at least 100° C. and more particularly still at least 130° C. The heating operation can be carried out by introducing the liquid mixture into a closed chamber (closed reactor of the autoclave type). Under the temperature conditions given above and in an aqueous medium, it can thus be specified, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures in the region of 100° C.

The heating can be carried out either under air or under an inert gas atmosphere, preferably under nitrogen.

The duration of the heating can vary within wide limits, for example between 1 and 48 hours, preferably between 2 and 24 hours. Likewise, the rise in temperature takes place at a rate which is not critical and the set reaction temperature can thus be reached by heating the liquid mixture, for example, for between 30 minutes and 4 hours, these values being given entirely by way of indication.

On conclusion of the heating stage, a solid precipitate is recovered which can be separated from its medium by any conventional solid/liquid separating technique, such as, for example, filtration, settling, draining or centrifuging.

The product as recovered can subsequently be subjected to washing operations which are then carried out with water or optionally with a basic solution, for example an aqueous ammonia solution, or an acidic solution, for example a nitric acid solution.

According to a specific alternative form of the invention, the process comprises a maturing.

This maturing is generally carried out on a suspension obtained after putting the precipitate back into water, in particular after the washing operation. The maturing is carried out by again heating this suspension. The temperature at which the suspension is heated is at least 40° C., more particularly at least 60° C. and more particularly still at least 100° C. Generally, this temperature is at most 200° C., more particularly at most 150° C. The medium is thus maintained at a constant temperature for a period of time which is usually at least 30 minutes and more particularly at least 1 hour. The maturing can be carried out at atmospheric pressure or optionally at a higher pressure.

The final calcination stage of this second process can be carried out in the same way as for the first process and thus that which was described above for this calcination likewise applies here.

In the case of the preparation of compositions with a support based on or essentially composed of alumina stabilized by a stabilizing element chosen from rare earth metals, barium and strontium, two other processes (third and fourth processes) can be employed, which processes will now be described.

D Third Process for the Preparation of the Compositions of the Invention

The third process according to the invention comprises the following stages:
(a) a liquid mixture comprising a colloidal dispersion of the supported oxide and, if appropriate, of the oxide of the element M, an aluminum compound and a compound of the stabilizing element is formed;
(b) the preceding mixture and a base are brought together, whereby a suspension comprising a precipitate is obtained;
(c) the suspension is optionally subjected to a maturing;
(d) the suspension thus obtained is dried;
(e) the dried product thus obtained is calcined.

The mixing of stage (a) is carried out in an aqueous phase, generally water.

Use is made, for the supported oxide, of any colloidal dispersion of the type described above.

The compound of the stabilizing element can in particular be a salt, such as a nitrate, an acetate, a chloride or a sulfate, in the form of a solution.

The aluminum compound is generally an alumina precursor, that is to say a compound which, after calcination, can result in alumina. This compound can thus be an aluminum hydroxide, such as bayerite, hydrargillite or gibbsite, or nordstrandite, or an aluminum oxyhydroxide, such as boehmite, pseudoboehmite and diaspore. The aluminum compound can be provided in the form of an aqueous suspension, in particular of an acidic suspension, for example comprising nitric acid. This suspension is then mixed with the dispersion of the supported oxide and the stabilizing element, the latter in the form of a solution, for example.

The second stage of the process consists in bringing together the mixture obtained in stage (a) and a base.

Use may be made, as base, of products of the hydroxide, carbonate or basic carbonate type, for example. Mention may be made of alkali metal or alkaline earth metal hydroxides, or secondary, tertiary or quaternary amines. However, amines and aqueous ammonia may be preferred insofar as they reduce the risks of pollution by alkali metal or alkaline earth metal cations. Urea may also be mentioned.

The contacting operation can be carried out in any order in a liquid medium.

The operation of bringing into contact with the base results in the formation of a precipitate in suspension in the liquid reaction medium.

The third stage is just an optional stage. This stage (c) consists in subjecting the suspension to a maturing. The maturing is carried out by heating the suspension at a temperature of at least 60° C., more particularly of at least 80° C. Generally, this temperature is at most 200° C., more particularly at most 150° C. The medium is thus maintained at a constant temperature for a time which is usually at least 30 minutes and more particularly at least 1 hour. The maturing can be carried out at atmospheric pressure or optionally at a higher pressure.

On conclusion of stage (b) or optionally of the maturing stage, when the latter is carried out, the abovementioned stages (d) and (e) are carried out. These two stages are similar to the final two stages of the first process of the invention and everything which was described above likewise applies to these stages (d) and (e). However, it should be noted that the drying can be carried out by a means other than atomization, for example in an oven.

An alternative form can be used in the context of this third process. This alternative form consists, on conclusion of stage (b) or optionally of the maturing stage, when the latter is carried out, in separating the precipitate from the suspension, in washing it and in redispersing it in water to form a second suspension. It is the latter suspension which is subsequently dried in stage (d).

The final calcination stage of this third process can be carried out in the same way as for the preceding processes and thus that which was described above for this calcination likewise applies here.

E Fourth Process for the Preparation of the Compositions of the Invention

The fourth process of the invention is now described below.

This process comprises the following stages:
(a) a liquid mixture comprising a colloidal dispersion of the supported oxide and, if appropriate, of the oxide of the element M and an aluminum compound is formed;
(b) the preceding mixture and a base are brought together, whereby a suspension comprising a precipitate is obtained;
(c) the suspension is optionally subjected to a maturing;
(d) a compound of the stabilizing element is added to the suspension thus obtained;
(e) the suspension resulting from the preceding stage is dried;
(f) the dried product thus obtained is calcined.

This process differs from the third process in that the compound of the stabilizing element is introduced in a different stage, on conclusion of stage (b) or optionally on the maturing stage, if the latter exists. Consequently, everything which was described for the third process likewise applies here. The compound of the stabilizing element is in particular of the same type as described above. Furthermore, it is also possible to employ the alternative form described above for the third process in which, on conclusion of stage (b) or optionally of the maturing stage, when the latter is carried out, the precipitate is separated from the suspension, washed and redispersed in water to form a second suspension. In this case, the compound of the stabilizing element is added to this second suspension.

The fourth process described here applies very particularly to the case where the stabilizing element is barium or strontium.

The compositions of the invention as described above or as obtained by the processes described above are provided in the form of powders but they can optionally be shaped in order to be provided in the form of granules, bulbs, cylinders or honeycombs of variable sizes.

The compositions of the invention can be used as catalysts or catalyst supports. Thus, the invention also relates to catalytic systems comprising the compositions of the invention. These systems comprise a coating (wash coat), with catalytic properties, based on these compositions and on a binder of known type, on a substrate of the metal or ceramic monolith type, for example. The coating can itself also comprise a support of the type of those mentioned above. This coating is obtained by mixing the composition with the binder, such as to form a suspension which can subsequently be deposited on the substrate.

These catalytic systems and more particularly the compositions of the invention can have a great many applications. They are therefore particularly well suited to, and thus useable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, in particular for automobile afterburning and in particular three-way catalysis, demetallation, methanation, the shift conversion or catalytic oxidation of the soot emitted by internal combustion engines, such as diesel engines or gasoline engines operating under lean burn conditions. Finally, the catalytic systems and the compositions of the invention can be used for the removal of NOx compounds by trapping the latter or as catalyst for the selective reduction of NOx compounds with urea/ammonia.

In the case of the uses in catalysis, the compositions of the invention can be employed in combination with precious metals or also transition metals in the oxide, sulfide or other form and they thus act as support for these metals. The nature of these metals and the techniques for the incorporation of the latter in the support compositions are well known to a person skilled in the art. For example, the metals can be gold, silver, platinum, rhodium, palladium, iridium, molybdenum, tungsten, nickel, cobalt, manganese or vanadium; they can in particular be incorporated in the compositions by impregnation.

Among the uses mentioned, the treatment of exhaust gases from internal combustion engines (automobile afterburning catalysis) is a particularly advantageous application. For this reason, the invention also relates to a process for the treatment of exhaust gases from internal combustion engines which is characterized in that use is made, as catalyst, of a catalytic system as described above or of a composition according to the invention and as described above.

It should be noted that the compositions of the invention in which the support is based on stabilized alumina are particularly advantageous as NOx trap. The invention thus also relates to a process for the treatment of exhaust gases from internal combustion engines which is characterized in that use is made, as NOx trap, of a composition according to the invention in which the support is based on stabilized alumina or a catalytic system comprising such a composition. This composition can more particularly be that corresponding to one of the two embodiments described above in which the support is based on alumina stabilized by barium, strontium or lanthanum and the supported oxide mixtures of cerium oxide, of zirconium oxide and of oxide of a rare earth metal other than cerium or of cerium oxide, of praseodymium oxide and of oxide of a rare earth metal other than cerium and praseodymium.

The abovementioned systems are, for the treatment of exhaust gases, fitted in a known way in the exhaust mufflers of motor vehicles.

Examples will now be given.

EXAMPLE 1

This example relates to a composition based on cerium oxide on a silica support which is prepared by the second process described above.

A mixture comprising 70% of $SiO_2$ and 30% of $CeO_2$ is prepared by mixing, in a beaker with stirring, 35 g of $SiO_2$ powder (170 $m^2/g$), dispersed in 500 ml of $H_2O$ at pH 0.5, with an acidic (pH 0.5) $Ce(NO_3)_4$ solution comprising 15 g of $CeO_2$ ($CeO_2$ 80 g/l). The combined mixture is transferred into an autoclave and brought to 150° C. for 2 hours while stirring at 300 revolutions/min.

The cooled mixture is separated by filtration and washed with 2 l of water at pH 9. The cake obtained is dispersed in water at a concentration of oxide of 50 g/l (oxide) and then matured at 100° C. for 2 hours with stirring. After cooling, the suspension is separated by centrifuging. The cake is subsequently calcined under air at 800° C. for 6 h.

EXAMPLE 2

This example relates to a composition based on a mixed oxide of cerium and of zirconium on a silica support which is prepared by the first process described above.

A colloidal dispersion of particles of a mixed oxide of formula $Ce_{0.5}Zr_{0.5}O_2$ is prepared beforehand.

For this, 95.7 ml of a first solution, comprising 1.5 M/l of $Ce(NO_3)_4$ and 0.5 M of $HNO_3$, are mixed with 43.7 ml of a second solution comprising 3.3 M/l of $ZrO(NO_3)_2$. The volume of the solution obtained is brought to 2300 ml by addition of water. The final pH is 1.9.

186 ml of 28% $NH_3$ solution are added instantaneously. The pH increases to 10 and the formation of a precipitate is observed.

The precipitate is filtered off and then washed with 2400 ml of deionized water. Washing is repeated 3 times in succession with an identical volume of washing solution. The pH of the final suspension is 7.5.

The cake is resuspended in a solution comprising 20.2 g of a 68% nitric acid $HNO_3$ solution ($H^+/(Ce+Zr)=0.75$ in moles) and the volume is made up to 500 ml by addition of deionized water. The Ce+Zr concentration is equal to 0.29 mol/l. After stirring overnight, a colloidal dispersion with a size of 4 nm is obtained which is clear to the eye.

Aminocaproic acid is added to this dispersion so as to obtain a final pH of 4.5 (98% 6-aminocaproic acid, Aldrich).

100 g of $SiO_2$ powder (170 $m^2/g$) are added to 550 ml of the colloidal dispersion of mixed Ce/Zr oxide in a beaker with stirring. The mixture is kept stirred for 15 minutes.

This suspension is atomized at 110° C. (outlet temperature 110° C., inlet temperature 220° C.) with a flow rate of 1 l/h.

The powder is calcined under air at 800° C. for 6 h.

EXAMPLE 3

This example relates to a composition based on a mixed oxide of cerium and of zirconium on an alumina support which is prepared by the first process described above.

A boehmite sol is prepared in a beaker equipped with a magnetic bar by dispersing, with stirring, 78.6 g of an AlOOH powder (Pural B21 alumina comprising 71.25% of $Al_2O_3$) in 700 ml of $H_2O$ brought to pH 2 using a 68% concentrated $HNO_3$ solution. After a few hours, a gel is obtained at pH 4.

At the same time, a colloidal dispersion of particles of mixed oxide of formula $Ce_{0.5}Zr_{0.5}O_2$ is prepared as described in example 2. Aminocaproic acid is likewise added thereto, so as to obtain a final pH of 4.5.

2 liters of the dispersion of mixed oxide $CeO_2/ZrO_2$ are introduced with stirring at the rate of 50 ml/min into the 700 ml of the boehmite dispersion prepared above. The mixture is kept stirred for 15 minutes and then atomized (inlet temperature 245° C., outlet temperature 110° C.) at a flow rate of 1 liter/hour.

The powder is calcined under air at 800° C. for 6 h.

The characteristics of size of the supported oxide and of specific surface of the composition for the compositions prepared in examples 1 to 3 are given in the following table 1.

TABLE 1

Sizes of the supported particles and specific surfaces
Calcination 800° C./6 h

| Example | X-ray size (nm) | BETS ($m^2/g$) |
|---------|-----------------|----------------|
| 1 | 6 | 161 |
| 2 | 6 | 95 |
| 3 | 6 | 113 |

EXAMPLE 4

In this example, the values for reducibility of the cerium, measured for the compositions described in the preceding examples, are given.

The reducibility of the cerium is measured by temperature-programmed reduction in the following way. Use is made of a Micromeritics Autochem 2920 device with a quartz reactor and a 200 mg sample which has been calcined beforehand at 800° C. for 6 hours under air. The gas is hydrogen at 10% by volume in argon and with a flow rate of 25 ml/min. The temperature rise takes place from ambient temperature to 900° C. at the rate of 20° C./min. The signal is detected with a thermal conductivity detector. The temperature is measured in the sample using a thermocouple.

The reducibility of the cerium is calculated from the hydrogen consumption, it being understood that ½ mol of $H_2$ consumed and measured by the method described above corresponds to 1 mol of reduced Ce(IV). The hydrogen consumption is calculated from the missing area of the hydrogen signal from the base line at 30° C. to the base line at 900° C. (respectively 600° C.) when the reducibility is measured between 30° C. and 900° C. (respectively 600° C.)

The reducibility values are collated in table 2.

TABLE 2

| Example | Reducibility of the cerium (%) | |
|---|---|---|
| | 30° C.-600° C. | 30° C.-900° C. |
| 1 | 41 | 100 |
| 2 | 44 | 87 |
| 3 | 41 | 82 |

The examples which follow relate to compositions for which the support is based on stabilized alumina.

The starting materials used in these examples are as follows:

Sasol SB1 boehmite comprising 78% by weight of oxide
Barium nitrate comprising 99% by weight of oxide
Lanthanum nitrate solution comprising 454 g/l of oxide
Ceric nitrate solution comprising 256 g/l of oxide with a cerium(III) content of 0.11 mol/1 and a Ce(III)/total cerium atomic ratio of 0.06
Zirconyl nitrate solution comprising 18.7% by weight of oxide
68 vol % nitric acid
28 vol % aqueous ammonia

EXAMPLE 5

This example relates to a composition based on cerium oxide on a support made of alumina stabilized by lanthanum, the proportions by weight of which, expressed as oxide, are 75%, 20% and 5% respectively for the aluminum, the lanthanum and the cerium.

96 g of boehmite are added to an acidic solution, comprising 19 g of 5 mol/1 nitric acid and 300 ml of demineralized water, in a beaker equipped with a magnetic bar and a pH electrode. The pH of the solution is 1.9. 35 g of the cerium oxide sol described in example 4 of European patent No. 208 581 51 and then a mixture of 74 g of lanthanum nitrate in 50 ml of demineralized water are added to this mixture with stirring. This mixture is then gradually introduced with stirring into a vessel heel comprising 25 g of aqueous ammonia and 500 ml of demineralized water. The reaction mixture is subsequently subjected to maturing at 100° C. for one hour. The solid phase is separated from the supernatant by centrifugation. The solid phase is redispersed in demineralized water so that the total volume is 600 ml. The suspension is subsequently atomized on a device of Büchi Mini-Spray Dryer 190 type, inlet temperature=230° C., outlet temperature=115° C.

The powder obtained is calcined under air at 600° C. for 2 h.

The specific surfaces obtained after subsequent calcinations at different temperatures are shown below.
2 h 600° C.=166 $m^2/g$
6 h 800° C.=120 $m^2/g$
2 h 900° C.=112 $m^2/g$
2 h 1000° C.=70 $m^2/g$

EXAMPLE 6

This example relates to a composition based on mixed oxide of cerium, of zirconium and of praseodymium comprising 25% by weight of oxides on a support formed of alumina stabilized by lanthanum in the overall proportions by weight, expressed as oxide, of 14%/6%/5%/15%/60% respectively for $CeO_2/ZrO_2/Pr_6O_{11}/La_2O_3/Al_2O_3$.

1) Preparation of a Colloidal Dispersion of $CeO_2$—$ZrO_2$—$Pr_6O_{11}$ Mixed Oxide A colloidal dispersion of particles of a $CeO_2$—$ZrO_2$—$Pr_6O_{11}$ mixed oxide is prepared beforehand according to the specific process described above.

320 g of cerium nitrate solution, 121.5 g of zirconyl nitrate solution and 70 g of praseodymium nitrate solution are introduced with stirring into a beaker comprising 151 ml of demineralized water. The solution thus obtained is gradually introduced with stirring into a vessel heel comprising 160 g of aqueous ammonia and 321 g of demineralized water. The solid phase is separated from the supernatant by filtration. The solid phase is washed with demineralized water or in a sintered glass filter. The solid phase is redispersed in a mixture of 45 g of nitric acid and 250 g of demineralized water. The solution obtained is then made up with demineralized water in order to achieve a total volume of 950 ml. The concentration of the solution is then 112 g/l of oxides and the pH is 1.0. This dispersion is heated at 80° C. for 1 h and a colloidal dispersion is obtained.

2) Deposition of the Colloidal Dispersion of $CeO_2$—$ZrO_2$—$Pr_6O_{11}$ Mixed Oxide on the Support Formed of Alumina Stabilized with Lanthanum A suspension of 38.5 g of boehmite and 8 ml of nitric acid (5M) is added to 125 g of the colloidal dispersion of $CeO_2$—$ZrO_2$—$Pr_6O_{11}$ mixed oxide prepared in 1). 28 g of lanthanum nitrate solution are subsequently added with stirring and the mixture is made up with demineralized water in order to obtain a total volume of 500 ml. This mixture is gradually introduced with stirring into a vessel heel comprising 22.5 g of aqueous ammonia and 200 ml of demineralized water. The final pH of the suspension is 9. The medium is subsequently heated at 95° C. for 1 h and is then cooled before being filtered in order to recover the solid phase, which is then washed with demineralized water on a sintered glass filter and redispersed in demineralized water (total volume of 500 ml) at a concentration of oxides of 100 g/l.

The suspension is then atomized on a device of Büchi Mini-Spray Dryer 190 type, inlet temperature=225° C., outlet temperature=115° C.

The powder obtained is calcined under air at 800° C. for 6 h.

The specific surfaces obtained after subsequent calcinations at different temperatures are shown below.
6 h 800° C.=120 $m^2/g$
2 h 900° C.=94 $m^2/g$
2 h 1000° C.=71 $m^2/g$

EXAMPLE 7

This example relates to a composition based on mixed oxide of cerium, of zirconium and of praseodymium charged with 25% by weight of oxides on support made of alumina stabilized with barium in overall proportions by weight, expressed as oxide, of 14%/6%/5%/15%/60% respectively for $CeO_2/ZrO_2/Pr_6O_{11}/BaO/Al_2O_3$.

A dispersion of 38.5 g of boehmite and 1.5 g of 15.2 mol/l concentrated nitric acid is added, with stirring, to 125 g of the colloidal dispersion of $CeO_2$—$ZrO_2$—$Pr_6O_{11}$ mixed oxide prepared in 1) of example 6. 515 ml of demineralized water are subsequently added with stirring in order to obtain a suspension comprising 50 g/l of oxides. This suspension is gradually introduced with stirring into a vessel heel comprising 21 g of aqueous ammonia and 176 ml of demineralized water. The final pH of the suspension is 9.3 at the end of the introduction. The medium is subsequently heated at 100° C. for 1 h and then it is cooled before being filtered in order to recover the solid phase, which is then washed with demineralized water on a sintered glass filter. The solid is subsequently redispersed in order to obtain a total volume of 500 ml in a solution of 160 ml of demineralized water and 13 g of barium nitrate.

The suspension is then atomized on a device of Büchi Mini-Spray Dryer 190 type, inlet temperature=235° C., outlet temperature=110° C.

The powder obtained is calcined under air at 600° C. for 2 h.

The specific surfaces obtained after subsequent calcinations at different temperatures are shown below.

2 h 600° C.=142 $m^2/g$
6 h 800° C.=112 $m^2/g$
2 h 900° C.=93 $m^2/g$
2 h 1000° C.=76 $m^2/g$

EXAMPLE 8

This example relates to a composition based on mixed oxide of cerium, of zirconium and of lanthanum comprising 25% by weight of oxides on a support formed of alumina stabilized with barium in overall proportions by weight, expressed as oxide, of 20.4/2.4/2.2/15/60% respectively for $CeO_2/ZrO_2/La_2O_3/BaO/Al_2O_3$.

1) Preparation of a Colloidal Dispersion of $CeO_2$—$ZrO_2$—$La_2O_3$ Mixed Oxide A colloidal dispersion of particles of a $CeO_2$—$ZrO_2$—$La_2O_3$ mixed oxide is first prepared according to the process described in example 6.

457 g of cerium nitrate solution, 51 g of zirconyl nitrate solution and 33.5 g of lanthanum nitrate solution are introduced with stirring into a beaker comprising 126 ml of demineralized water. The solution thus obtained is gradually introduced with stirring into a vessel heel comprising 165 g of aqueous ammonia and 316 g of demineralized water. At the end of the introduction, there is a pH of 9.2. The solid phase is separated from the supernatant by filtration. The solid phase is washed with demineralized water on a sintered glass filter. The solid phase is redispersed in a mixture of 50 g of nitric acid and 200 g of demineralized water. The solution obtained is then made up with demineralized water in order to achieve a total volume of 950 ml. The concentration of the solution is then 111.5 g/l of oxides and the pH is 0.9. This dispersion is heated at 80° C. for 1 h and a colloidal dispersion is obtained.

2) Deposition of the Colloidal Dispersion of $CeO_2$—$ZrO_2$—$La_2O_3$ Mixed Oxide on the Support Formed of Alumina Stabilized with Barium A suspension of 38.5 g of boehmite and 8.5 ml of nitric acid (5M) is added to 126 g of the colloidal dispersion of $CeO_2$—$ZrO_2$—$La_2O_3$ mixed oxide prepared in 1), followed by 535 ml of demineralized water. This mixture is gradually introduced with stirring into a vessel heel comprising 25 g of aqueous ammonia and 200 ml of demineralized water. The final pH of the suspension is 9.2. The medium is subsequently heated at 95° C. for 1 h and is then cooled before being filtered in order to recover the solid phase, which is then washed with demineralized water on a sintered glass filter. The solid is subsequently redispersed in a mixture of 13 g of barium nitrate and 160 ml of demineralized water. The mixture is subsequently made up with demineralized water in order to obtain a total volume of 500 ml for the suspension.

The suspension is then atomized on a device of Büchi Mini-Spray Dryer 190 type, inlet temperature=225° C., outlet temperature=110° C.

The powder obtained is calcined under air at 600° C. for 2 h.

The specific surfaces obtained after subsequent calcinations at different temperatures are shown below.

2 h 600° C.=136 $m^2/g$
6 h 800° C.=105 $m^2/g$
2 h 900° C.=92 $m^2/g$
2 h 1000° C.=76 $m^2/g$

EXAMPLE 9

This example relates to a composition based on mixed oxide of cerium, of lanthanum and of praseodymium comprising 25% by weight of oxides on a support made of alumina stabilized with lanthanum in the overall proportions by weight, expressed as oxide, of 19/18/3/60% respectively for $CeO_2/La_2O_3/Pr_6O_{11}/Al_2O_3$.

1) Preparation of a Colloidal Dispersion of $CeO_2$—$La_2O_3$—$Pr_6O_{11}$ Mixed Oxide A colloidal dispersion of particles of a mixed oxide of $CeO_2$—$La_2O_3$—$Pr_6O_{11}$ mixed oxide is prepared beforehand.

426 g of cerium nitrate solution, 48 g of lanthanum nitrate solution and 38 g of praseodymium nitrate solution are introduced with stirring into a beaker comprising 147 ml of demineralized water. The solution thus obtained is gradually introduced with stirring into a vessel heel comprising 167 g of aqueous ammonia and 314 g of demineralized water. The solid phase is separated from the supernatant by filtration. The solid phase is washed with demineralized water on a sintered glass filter. The solid phase is redispersed in a mixture of 45 g of 68 vol % nitric acid and 300 g of demineralized water. The solution obtained is then made up with demineralized water in order to achieve a total volume of 1 l. The concentration of the solution is then 102 g/l of oxides and the pH is 1.0. This dispersion is heated at 80° C. for 1 h and a colloidal dispersion is obtained.

2) Deposition of the Colloidal Dispersion of $CeO_2$—$La_2O_3$—$Pr_6O_{11}$ Mixed Oxide on the Support Made of Alumina Stabilized with Lanthanum A suspension of 38.5 g of boehmite and 1.7 ml of nitric acid (15.2M) is added to 137 g of the colloidal dispersion of $CeO_2$—$La_2O_3$—$Pr_6O_{11}$ mixed oxide prepared in 1). The mixture is made up with demineralized water in order to obtain a total volume of 650 ml. The pH of the medium is 2.1. 28 g of lanthanum nitrate solution are then gradually introduced with stirring. The resulting mixture is gradually introduced with stirring into a vessel heel comprising 23 g of aqueous ammonia and 200 ml of demineralized water. The final pH of the suspension is 9.2. The medium is subsequently heated at 96° C. for 1 h and is then cooled to 50° C. before being filtered in order to recover the solid phase, which is then washed with demineralized water on a sintered glass filter and redispersed in 170 ml of demineralized water in order to obtain a concentration of oxides of 100 g/l.

The suspension is then atomized on a device of Büchi Mini-Spray Dryer 190 type, inlet temperature=240° C., outlet temperature=115° C.

The powder obtained is calcined under air at 800° C. for 6 h.

The specific surfaces obtained after subsequent calcinations at different temperatures are shown below.

6 h 800° C.=102 m²/g
2 h 900° C.=83 m²/g
2 h 1000° C.=61 m²/g

EXAMPLE 10

In this example, the values for reducibility of the compositions described in examples 5 to 9 are given.

The reducibility of the compositions is measured by temperature-programmed reduction in the following way. Use is made of a Micromeritics Autochem 2920 device with a quartz reactor and a 200 mg sample which has been calcined beforehand at 800° C. for 6 hours under air. The gas is hydrogen at 10% by volume in argon and with a flow rate of 25 ml/min. The temperature rise takes place with ambient temperature to 900° C. at the rate of 20° C./min. The signal is detected with a thermal conductivity detector. The temperature is measured in the sample using a thermocouple.

The reducibility of the cerium is calculated from the hydrogen consumption, it being understood that ½ mol of $H_2$ consumed and measured by the method described above corresponds to 1 mol of reduced Ce(IV). The hydrogen consumption is calculated from the missing area of the hydrogen signal from the base line at 30° C. to the base line at 900° C. when the reducibility is measured between 30° C. and 900° C.

The reducibility values are collated in table 3.

TABLE 3

| Example | Reducibility of the cerium (%) | Reducibility of the cerium and praseodymium (%) |
|---|---|---|
| 5 | 100 | — |
| 6 | — | 81 |
| 7 | — | 84 |
| 8 | 96 | — |
| 9 | — | 81 |

EXAMPLE 11

Measurement of catalytic performance as storage capacity for NOx compounds in an oxidizing medium.

This example illustrates the effectiveness of these materials used as precious metal support with regard to their storage capacity for nitrogen oxides NOx for catalytic compositions comprising 1% by weight of platinum prepared from the compositions of the preceding examples and in the following way.

5 g of compound according to one of the above examples are introduced into a beaker and then covered with water (50 ml) before the addition of a solution of tetraamine platinum hydroxide salt (3.125 ml at 16 g/l). After evaporation on a rotary evaporator, the catalytic composition thus obtained is dried in an oven at 120° C. for 2 h, then calcined at 500° C. under air for 2 h and aged at 700° C. under a 90% air/10% $H_2O$ mixture for 4 hours.

The NOx storage capacity is measured under the following conditions:

The catalytic composition as prepared above is introduced into a reactor and then pretreated at 300° C. for 12 hours under a gas stream with the following composition:

9% $O_2$+10% $H_2O$+2% $SO_2$+79% $N_2$ (corresponding to 1000 ppm of $SO_2$).

The reactor is isolated and then cooled to ambient temperature under an $N_2$ stream. This catalytic composition, thus sulfated, is introduced into a fresh reactor and heated from a temperature of 150° C. to a temperature of 600° C. under a reducing gas stream with the following composition:

4.9% $O_2$+10% CO+5% $CO_2$+10% HC (2500 ppm of $C_3H_6$+2500 ppm of $C_3H_8$ in $N_2$)+5% $H_2O$+ 65.1% $N_2$.

The catalytic composition as prepared above was subsequently maintained under this reducing stream for 20 minutes at a temperature of 600° C. The purpose of this treatment is to simulate a sulfation/desulfation cycle.

The reactor is subsequently isolated and then cooled under static conditions to ambient temperature. The reaction stream, with the composition: 10% $O_2$+5% $H_2O$+10% $CO_2$+ 300 ppm NO in nitrogen, analyzed continuously by a Nicolet Magna 560 Fourier transform infrared (FT-IR) spectrometer, is introduced into the catalytic reactor, placed beforehand at the desired reaction temperature. After stabilization of the stream monitored by NO+$NO_2$ analysis, the respective concentrations of NO and $NO_2$ at the reactor outlet are continuously determined by the FTIR spectrometer.

The integration of the NO and $NO_2$ concentrations during the minute following the arrival of the reaction stream over the catalytic composition makes it possible to calculate the amount of trapped NOx compounds. The results are expressed by the amount by weight of trapped NOx compounds (%) at 1 minute, with respect to the total amount of NOx compounds fed during this minute.

The measurements are subsequently carried out on other samples of catalytic compositions at the desired temperatures.

The amounts of NOx compounds trapped at the temperatures of 200° C., 300° C., 350° C. and 400° C. are listed in table 4. The catalytic compositions of tests 1, 2 and 3 of this table correspond respectively to the products obtained after impregnation with platinum, according to the process described above, of the composition of example 5 (test 1), example 7 (test 2) and example 9 (test 3).

TABLE 4

| | Trapped NOx compounds as % by weight | | | |
|---|---|---|---|---|
| Test | 200° C. | 250° C. | 300° C. | 400° C. |
| Test 1 (composition example 5) | 87 | 89 | 73 | 59 |
| Test 2 (composition example 7) | 97 | Not determined | Not determined | 92 |
| Test 3 (composition example 9) | 75 | Not determined | Not determined | 75 |

It is seen, from the results of table 4, that the compositions of the invention exhibit a high NOx storage efficiency in the temperature region between 200° C. and 400° C. They are very particularly effective in the region of low temperatures, at 300° C. or below, in particular at temperatures as low as 200° C. The catalytic compositions of the invention are therefore particularly effective over the entire temperature range and in particular at low temperatures, from 200° C. to 300° C. and more particularly still at 200° C. and 250° C.

The invention claimed is:

1. A catalyst/catalyst support composition in a powder form consisting essentially of:
   ceric oxide $CeO_2$; and
   a support composed of silica, alumina, titanium oxide, zirconium oxide, or any combination thereof, the ceric oxide being deposited onto the support and being in the form of particles having a size of at most 50 nm, which are separate or in the form of aggregates,
   wherein the composition exhibits, after calcination at a temperature of at least 800° C. for 6 hours, a reducibility measured from 30° C. to 900° C. of at least 80%.

2. The catalyst/catalyst support composition as defined by claim 1, wherein said particles have a size of at most 10 nm.

3. The catalyst/catalyst support composition as defined by claim 1, exhibiting a reducibility of at least 85%.

4. The catalyst/catalyst support composition as defined by claim 1, wherein the support essentially consists of alumina or alumina stabilized by at least one element selected from among the rare earth metals, silicon and zirconium.

5. The catalyst/catalyst support composition as defined by claim 1, wherein the supported oxide is at most 30% by weight.

6. The catalyst/catalyst support composition as defined by claim 1, wherein the ceric oxide is at most 50% by weight of the composition.

7. The catalyst/catalyst support composition as defined by claim 1, wherein said particles, in a separate form, have a size of at most 5 nm.

8. A catalytic system which comprises a catalyst/catalyst support composition as defined by claim 1.

9. A catalyst/catalyst support composition in a powder form consisting essentially of:
   ceric oxide $CeO_2$; and
   an alumina-based support made of alumina only or alumina stabilized by at least one element chosen from rare earth metals, silicon and zirconium,
   ceric oxide being deposited onto the alumina-based support and being in the form of particles having a size of at most 50 nm, which are separate or in the form of aggregates,
   wherein the composition exhibits, after calcination at a temperature of at least 800° C. for 6 hours, a reducibility measured from 30° C. to 900° C. of at least 80%, the alumina support of which additionally being devoid of the elements barium and strontium.

10. The catalyst/catalyst support composition as defined by claim 9, wherein the supported oxide is at most 30% by weight.

11. The catalyst/catalyst support composition as defined by claim 9, wherein said particles, separate or in the form of aggregates thereof, have a size of at most 10 nm.

12. The catalyst/catalyst support composition as defined by claim 9, wherein the ceric oxide is at most 50% by weight of the composition.

13. The catalyst/catalyst support composition as defined by claim 9, wherein said particles, in a separate form, have a size of at most 5 nm.

14. A process for the preparation of a catalyst/catalyst support composition as defined by claim 1, which comprises the following stages:
   (a) admixing a colloidal dispersion of the supported oxide and a suspension of the support;
   (b) drying the mixture thus formed by atomization; and
   (c) calcining the dried product thus obtained.

15. The process as defined by claim 14, wherein the colloidal dispersion of the supported oxide additionally comprises an amino acid.

16. A process for the preparation of a catalyst/catalyst support composition as defined by claim 1, which comprises the following stages:
   (a) providing a liquid mixture comprising a salt of cerium and a suspension of the support;
   (b) heating the mixture thus formed at a temperature of at least 100° C. to form a precipitate;
   (c) recovering the precipitate obtained from step (b) to form a recovered precipitate; and
   (d) calcining said recovered precipitate.

17. A process for the preparation of a catalyst/catalyst support composition as defined by claim 1, wherein the support comprises alumina stabilized by a stabilizing element selected from among the rare earth metals, barium and strontium, which comprises the following stages:
   (a) providing a liquid mixture comprising a colloidal dispersion of the supported oxide an aluminum compound and a compound of the stabilizing element;
   (b) mixing the mixture thus provided and a base, whereby a suspension comprising a precipitate is obtained;
   (c) drying the suspension thus obtained; and
   (d) calcining the dried product thus obtained.

18. A process for the preparation of a catalyst/catalyst support composition as defined by claim 1, wherein the support comprises alumina stabilized by a stabilizing element selected from among the rare earth metals, barium and strontium, which comprises the following stages:
   (a) providing a liquid mixture comprising a colloidal dispersion of the supported oxide and an aluminum compound;
   (b) mixing the mixture thus provided and a base, whereby a suspension comprising a precipitate is obtained;
   (c) adding a compound of a stabilizing element to the suspension thus obtained;
   (d) drying the suspension resulting from the preceding stage (c); and
   (e) calcining the dried product thus obtained.

19. The process as defined by claim 18, wherein the suspension resulting from stage (b) is subjected to a maturing before stage (c).

20. The process as defined by claim 18, wherein the suspension is dried by atomization.

21. The process as defined by claim 18, wherein step (c) additionally comprises separating the precipitate from the suspension, washing, and redispersing in water to form a second suspension.

22. The process as defined by claim 18, wherein the compound of the stabilizing element is a salt thereof.

23. A process for the catalytic treatment of exhaust gases emanating from an internal combustion engine comprising contacting the exhaust gases with the composition as defined by claim 14.

24. The process as defined by claim 23, said treatment including contacting the exhaust gases with a NOx trap.

* * * * *